United States Patent [19]

Soltesz

[11] Patent Number: 5,027,401
[45] Date of Patent: Jun. 25, 1991

[54] SYSTEM FOR THE SECURE STORAGE AND TRANSMISSION OF DATA

[76] Inventor: John A. Soltesz, 1082 Broadway Ave., Masury, Ohio 44438

[21] Appl. No.: 547,224

[22] Filed: Jul. 3, 1990

[51] Int. Cl.$^5$ ............................ G09C 5/00; G07F 7/08
[52] U.S. Cl. ........................................ 380/54; 380/23; 380/24; 380/49; 235/379; 235/380
[58] Field of Search .................... 379/53, 54; 235/379, 235/380; 902/25, 380/3-5, 9, 10, 16, 23-25, 49, 50, 54, 235/382

[56] References Cited

U.S. PATENT DOCUMENTS

| 4,529,870 | 7/1985 | Chaum ............................ 235/380 |
| 4,531,024 | 7/1985 | Colton et al. .................... 379/54 X |
| 4,864,108 | 9/1989 | Hamada et al. .................. 235/379 |
| 4,879,747 | 11/1989 | Leighton et al. ................ 380/23 |

Primary Examiner—Bernarr E. Gregory
Attorney, Agent, or Firm—Bacon & Thomas

[57] ABSTRACT

A system for the secure storage and transmission of data utilizes a visual algorithm to encode sensitive data in a secure manner onto a data card or other storage device. Whether a photograph or other image, data representing pixels are encoded by scrambling them one color at a time, with scrambling instructions being encoded in the pixels themselves. A character assigned to each color is used for additional verification of the authorization during decoding. In a preferred embodiment, the time of encoding is the basis for the characters assigned to respective colors.

12 Claims, 3 Drawing Sheets

FIG. 4
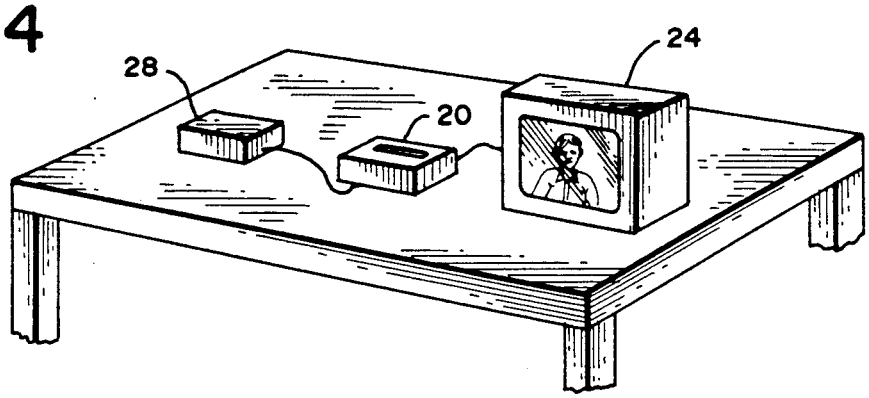
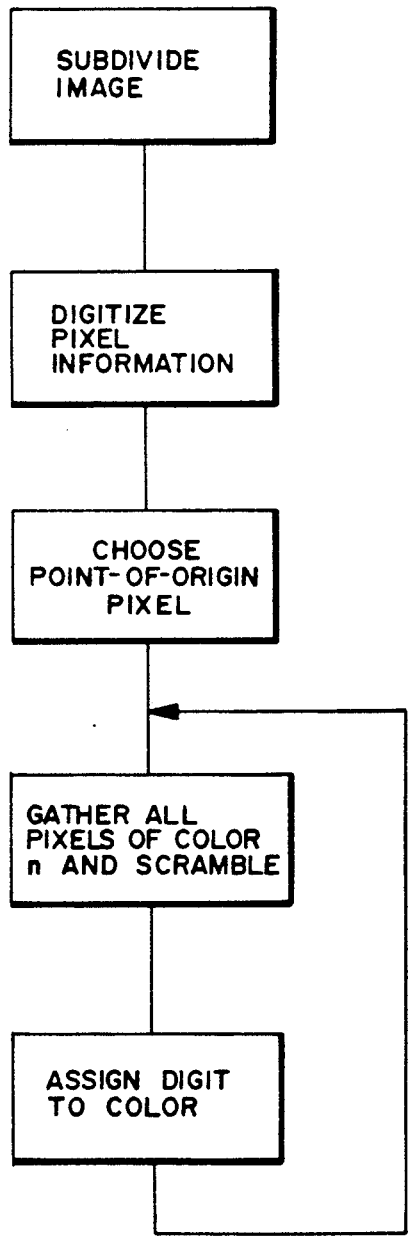
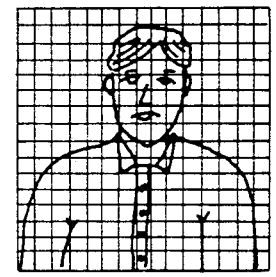
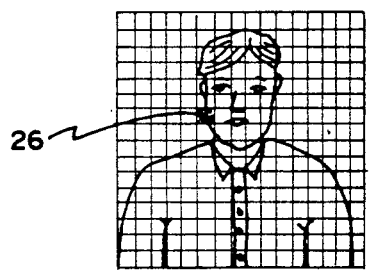
FIG. 5

SYSTEM FOR THE SECURE STORAGE AND TRANSMISSION OF DATA

BACKGROUND OF THE INVENTION

1. Field of the Invention

The present invention relates generally to the field of data storage and, more particularly, to the field of the secure storage and transmission of data.

2. Description of the Related Art

In the banking industry, billions of dollars are lost every year due to the unauthorized access to data and accounts. In the field of credit card transfer, various attempts have been made to prevent or curtail such abuse, including the addition of a signature line to the back of the credit card, and the addition of a hologram to the front of the card. Concerning the former, a clerk handling a credit card transaction should compare the signature on the back of the credit card to the signature on the transaction slip; however, in practice, such comparison is rarely made, and if made, is rarely carefully done. Concerning the latter, while a hologram prevents the easy counterfeit of a credit card, it does nothing to prevent the fraudulent use of a validly issued card that has been misappropriated by one not authorized to use it.

Losses are also generated as a direct result of the unauthorized access to information transmitted over airwaves or by computer networks. No truly reliable system practical enough to be implemented has been developed to pare these huge losses since, by their very nature, a relatively large number of individuals must have access to the information.

Therefore, the need for a system that effectively prevents the unauthorized access to account information as well as to funds contained in personal and commercial accounts has long been recognized, but not adequately satisfied. In addition to those attempts mentioned above, various encryption algorithms have been developed and applied to many forms and applications of data and data storage. The encryption algorithms, however, suffer from high complexity, which leads to increased cost and implementation difficulties.

Two systems addressed to the same problems are shown in Simjian, U.S. Pat. No. 3,569,619, and Leighton et al., U.S. Pat. No. 4,879,747. In Simjian, a system is disclosed for storing an authorized credit card user's image on microfilm along with a code on a credit card, so that a point-of-sale device can read the code, call up the image from an external store, and display the image on a screen for comparison with the card holder. No further security measures are taken to protect the data.

Leighton et al., discloses a personal identification system that incorporates a highly sophisticated RSA-type of encoding in a public key-private key system. The disclosed system may be used to store photographic, medical history, or other data onto a data card, but does not rely on an image-based algorithm for storage of secure information.

SUMMARY OF THE INVENTION

The present invention utilizes a visual algorithm to encode sensitive data onto a medium from which the data can later be retrieved for decoding. The image of a person or of other alphabetical, numerical, or alphanumerical data is first digitized, then scrambled pixel-by-pixel using a highlighted point-of-origin pixel as a key to initiating decoding.

The scrambling process begins with a first color being chosen, all pixels of that color being read and scrambled in some fashion until the last pixel of that color is read. Then, a digit is assigned to that color. The digit may come from a random number-based digit sequence or from a sequence derived from the time of encoding. An instruction may also be encoded into the last pixel to indicate the second color to be retrieved. The process is then continued until as many colors and digits as required are correlated and scrambled.

Finally, the data are recorded onto a data card or other medium. A decoder reads the scrambled data from the card by first locating the point-of-origin pixel. The visual algorithm is then implemented to decode the data and reassemble it for display on a screen. Preferably, a printout is also made of the decoded image. Additionally, the descrambled image or other information retrieved during decoding may be recorded or otherwise stored for later referral.

BRIEF DESCRIPTION OF THE DRAWINGS

FIG. 4 illustrates one embodiment of the invention in a retail application; FIG. 5 illustrates schematically a visual algorithm useful in carrying out the invention.

DETAILED DESCRIPTION OF THE PREFERRED EMBODIMENTS

Although the drawings and much of the description below are directed to a preferred embodiment of the invention, in which the image of a person who has been authorized to use a credit or other data card is encoded onto the card, the broader nature of the invention is not limited to this embodiment, but instead extends to the secure storage and transmisson of data in general. Various references throughout the description serve to emphasize this point.

Figure 1:
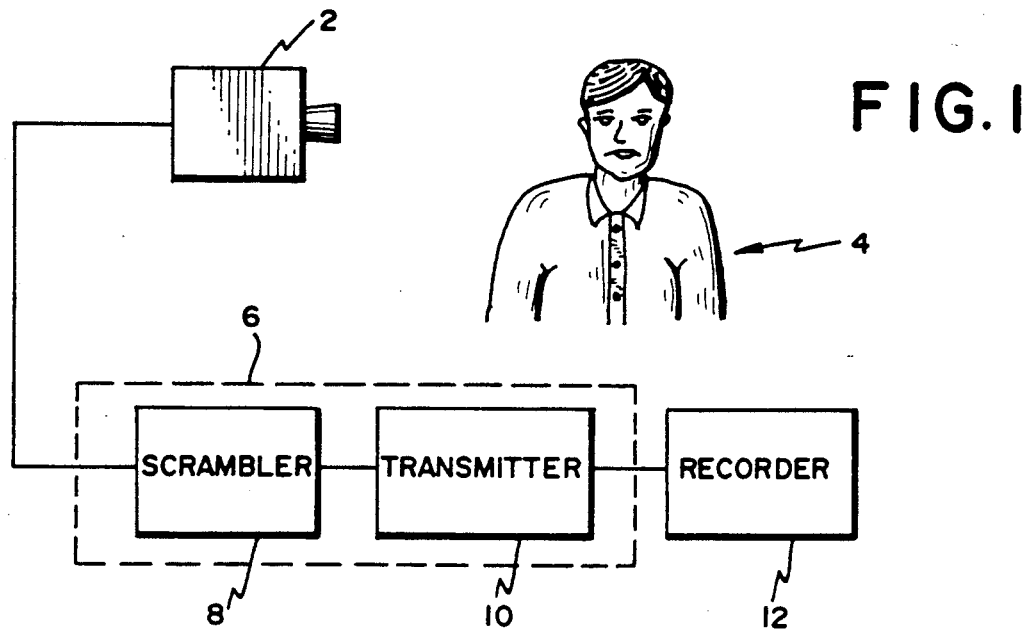
FIG. 1 illustrates a block diagram of the inventive encoding process for a picture-taking embodiment of the invention.

Referring first to FIG. 1, the block diagram that implements the inventive encoding process includes a conventional digital video camera 2, for example, of the charge-coupled device (CCD) type. As for all block diagrams that depict the invention, FIG. 1 illustratively shows one possible hardware implementation. Camera 2 includes means for digitizing the image of subject 4, although separate digitizing and processing means may be used. One of ordinary skill in the art will readily recognize that many modifications concerning the number and type of individual components are possible.

The digitized output from camera 2 is received at encoder 6. As shown in FIG. 1, encoder 6 comprises at least two primary elements, scrambler 8 and transmitter 10. Scrambler 8 receives the digitized signal from camera 2 and scrambles it according to a process described below, so that anyone intercepting the output from transmitter 10 will be unable to readily decipher it. This aspect relates both to the specific card-encoding aspect of the invention, and also shows the broader application of the invention to data transmission in general.

Transmitter 10, therefore, may take any of a number of forms, depending upon the particular application of the invention. In the broad sense, transmitter 10 is a means for transferring the scrambled data from the output of scrambler 8 to recorder 12, which places the scrambled information into (onto) some sort of storage medium. Depending upon the specific implementation of the invention, however, transmitter 10 may comprise a radar transmitter, a microwave transmitter, or, as in the embodiment shown, appropriate wiring for passing the scrambled data from the scrambler 8 (or from storage after scrambling) to recorder 12, such that no over-the-air transmission occurs at all.

Returning to FIG. 1, the encoder 6 thus provides scrambled data to recorder 12. For the current embodiment, in which recorder 12 preferably records the data onto a data card, recorder 12 may take any of a variety of forms known to the art. For example, recorder 12 may comprise an optical recorder; the data card thus must be capable of being written onto and read from in an optical format. Any optical system known to the art that is capable of recording the required volume of data onto the size of the card may be used. A person's face, for example, may require as much as 0.25 Mbytes or more of digital information to fully encode according to the invention; present technology is capable of recording at least 16 times that much information onto a credit card-sized data card in an arcuate format.

The scrambled data may also be recorded according to any of the known magnetic encoding systems. One drawback, however, to a magnetic system is that a magnetic system is incapable of storing as much information as may be necessary for many applications of the invention. A great volume of data, for example, is required simply to digitize an image, without considering error correction, redundancy, instructions, and other information that may be desired to be encoded along with the image. Where practical, however, a magnetic system may be used.

One of ordinary skill will also recognize that a chip-embedded smart card may implement the invention, assuming sufficient memory space in the chip. A smart card may also be utilized for only a portion of the procedure (e.g., to store instructions) if practicable.

Figure 2:
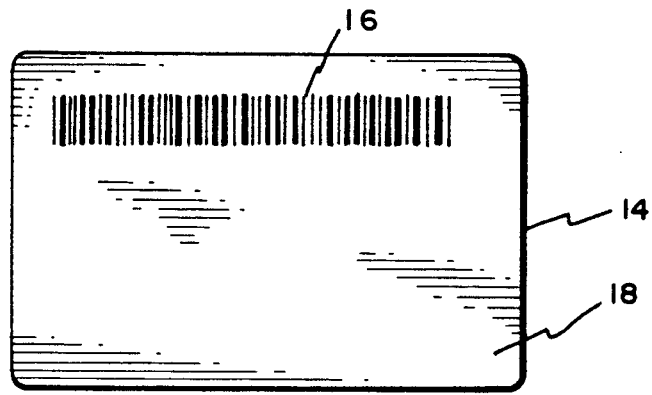
FIG. 2 shows a preferred form of a data card useful in accordance with the teachings of the present invention.

Turning to FIG. 2, a preferred form of the data card and its encoded fields is shown. By way of example, data card 14 includes two fields on one side of the card. Field 16 is illustratively a bar-coded field, set aside for storing a preliminary enablement code (such as a PIN number) for accessing the scrambled data. Field 18, which may comprise much of the rest of the side of the card or more, is illustratively reserved for the scrambled information. The information contained in bar code field 16 may alternatively or additionally be contained in field 18, in scrambled or unscrambled form.

Figure 3:
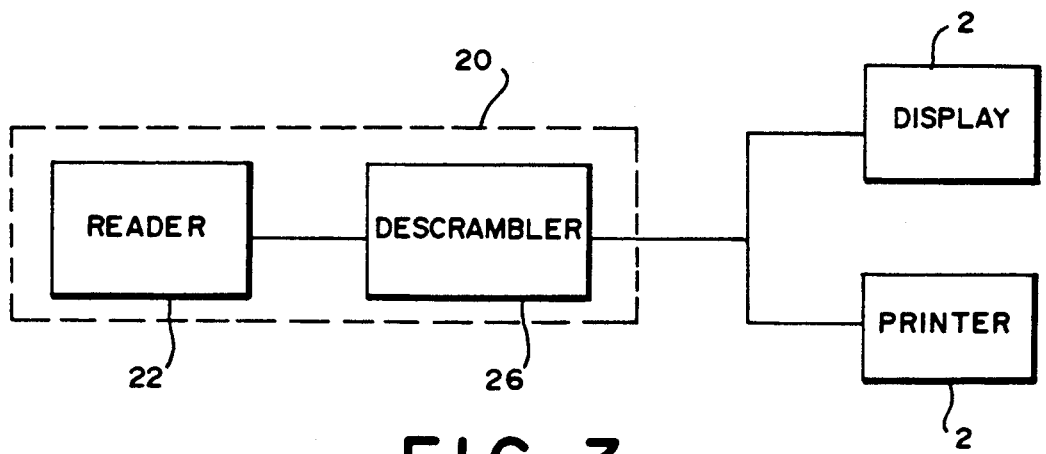
FIG. 3 illustrates a block diagram of the decoding process of the invention.

FIG. 3 is a block diagram illustrating the operation of signal decoder 20. When the data card or other source of scrambled information outputs its digital information into decoder 20, the information is first read by reader 22. Decoder 20 then descrambles the data according to a novel visual algorithm once the enabling key or keys encoded in field 16 are satisfied. Following the descrambling procedure, the data is presented either on display means 24 as shown, or in some other suitable form, depending on the application.

FIG. 4 illustrates how the signal decoder subsystem works in a preferred embodiment. In the illustration, decoder 20 is shown connected to display 24, with both resting on the transaction counter in, for example, a retail store or a commercial bank. According to one aspect of the invention, when a card bearer presents a card to make a purchase or other transaction, the clerk runs the card through decoder 20, and the image stored on the card appears on the screen of display 24. The clerk can then verify that the card bearer is authorized to use the card by comparing the image on display 24 to the bearer. Following the verification procedure, whether or not use of the card is approved, the image descrambled by decoder 20 is preferably recorded by printer 28. The printout need not be of highest quality, but merely adequate to assist in the identification of the image in case the card holder has somehow managed to encode his own image onto the card of another. Of course, any other suitable form of recording the image for later reference may be implemented.

Although signal decoder 20 has been described in the environment of reading and descrambling data cards, the broader teachings of the invention should be kept in mind, since decoder 20 is more properly considered a signal decoder and not merely a card reader. Its function in a non-card, secure data signal transmission environment is thus apparent from the description.

Turning to FIG. 5, a preferred visual scrambling algorithm is shown for scrambling an image for later retrieval by a decoder. The term *visual algorithm* is used to emphasize that the scrambling process relies on the image nature of the data to be scrambled. Therefore, textual data, for example, may be captured as an image and then encoded, rather than encoding character-by-character. As mentioned above, the embodiment described next is illustrative of a much broader scope belonging to the invention; any information in tangible form may be converted into an image by photographing or otherwise imagewise recording it. Similarly, the scrambling algorithm described below may be adapted to nonimage information without undue experimentation.

The first step in the preferred visual scrambling algorithm is to subdivide the image into a plurality of pixels. Each pixel is capable of representing one color from a range of possible colors. For example, a range of color from white to gray in a black-and-white image may be represented by 360 shades. Even a textual image of black characters on a lighter background has shades of color in the sense that some individual pixels represent subdivisions that are part background and part character, and therefore average to a shade of gray. For the purposes of the invention, a smaller range may well be suitable for capturing an accurate image of a card holder's face. Of course, true color (as opposed to shades of black and white) images may be encoded according to the invention.

Each pixel is then digitized according to known methods, resulting in a stream of data. The system may be designed to handle the stream one pixel at a time, or it may be designed with plural processors to parallel-process the data. In either case, one pixel 26 is chosen to be a "point-of-origin" pixel. This pixel may or may not be altered. For the purpose of illustration, it will be assumed that it is not scrambled.

Pixel 26 is termed a point-of-origin pixel because it is the first pixel at which decoder 20 will begin unscrambling. As such, it must somehow be encoded in such a way that decoder 20 can tell that it is the point of origin. One such way to "highlight" pixel 26 is to make it occupy the same location in the pixel stream in every scrambling operation. While this may appear to make the system less secure, in fact the security of the system may not be breached, since other aspects of the algorithm lend protection as well.

Pixel 26 may be highlighted in other ways as well. It may be a color that is uniquely defined as the origin. It may also be designated in an appropriately secure manner in the bar-coded field 16. Furthermore, it may be designated by a particular data string embedded in the image data by the encoder.

Pixel 26 represents more than just the beginning point for the scrambling operation: it also holds the first instruction for the scrambler 8. Scrambler 8 reads the color of pixel 26 and, on the basis of the color, scans the entire data stream (serial or parallel) for all pixels of a first particular color. The color sought may be the same as pixel 26, or it may be a different color found, for example, by consulting a lookup table accessible to the encoder. Pixel 26 may indicate the first color by any other manner that would properly enable pixels of the first color to be identified and retrieved during the scan, so long as the data space required to perform the function does not exceed the capacity of the card.

Once all pixels of the first color are retrieved, they are scrambled within the data stream at random. Alternatively, they could be stored for later scrambling onto the data field 16. However scrambled, when all pixels of the first color have been processed, the first color is assigned a first digit, and the first digit stored in scrambled or unscrambled form, preferably within the data stream. This first digit will later be compared to a unique number to verify that decoder 20 is properly decoding the scrambled information. The invention is not limited to numerals as digits, although they are preferred so that the digit sequence may be tied to the time of encoding, as described in detail below. An alphabetical or alphanumerical code could alternatively be used. *Digit*, therefore, should be understood as meaning *character* in a broader sense.

After the first digit is assigned, a second color is chosen based upon the last pixel retrieved from the pixels of the first color. Again, a lookup table may be empoyled to correlate a location with a color or the first color with the second color, or some other means of associating the last pixel of the first color may be used. As a further example, the last pixel of the first color may be encoded with a "jump right" or "jump left" instruction into its color, directing the decoder 20 to choose the second color by simply moving in the direction indicated.

All pixels of the second color are then retrieved in the same manner as were the first, until the last pixel of the second color is retrieved. At this point, the second-color pixels are scrambled into the data stream (or into memory with the first-color pixels) according to a predetermined algorithm or at random. A second digit is assigned to the second color and stored, and an instruction from the last second-color pixel read to determine the third color to be retrieved.

All pixels of a sequence of colors are thus retrieved and scrambled until a desired number of pixels have been so processed. It is not strictly necessary to scramble every color in an image having a wide range of colors, for a scrambling of fewer than all pixels will still render the image unintelligible. This fact may be beneficial for compression purposes, should compression be desired, since, e.g., background color may be compressed to save storage space without affecting the complexity of the scrambling or the unintelligibility of the image.

When all colors desired to be retrieved and scrambled have been, a sequence of digits will have been produced. This sequence of digits is preferably stored, unscrambled or scrambled, for later retrieval. As mentioned above, the sequence of digits may be stored in the image data stream, or in a separate location on the card.

All data thus compiled are then recorded onto the data card using, for example, an optical system of the type manufactured by The Drexler Corporation of Mountain View, Calif., or Optical Recording Corporation of Toronto, Canada. All data may be written in uncompressed form, or any form of data compression known to the art may be used on some or all of the data. For example, the relatively unimportant background data may be compressed, while the scrambled image data is uncompressed to ensure accurate descrambling. Error correction data may also be written onto the card, space permitting, should such be desired.

Figure 6:
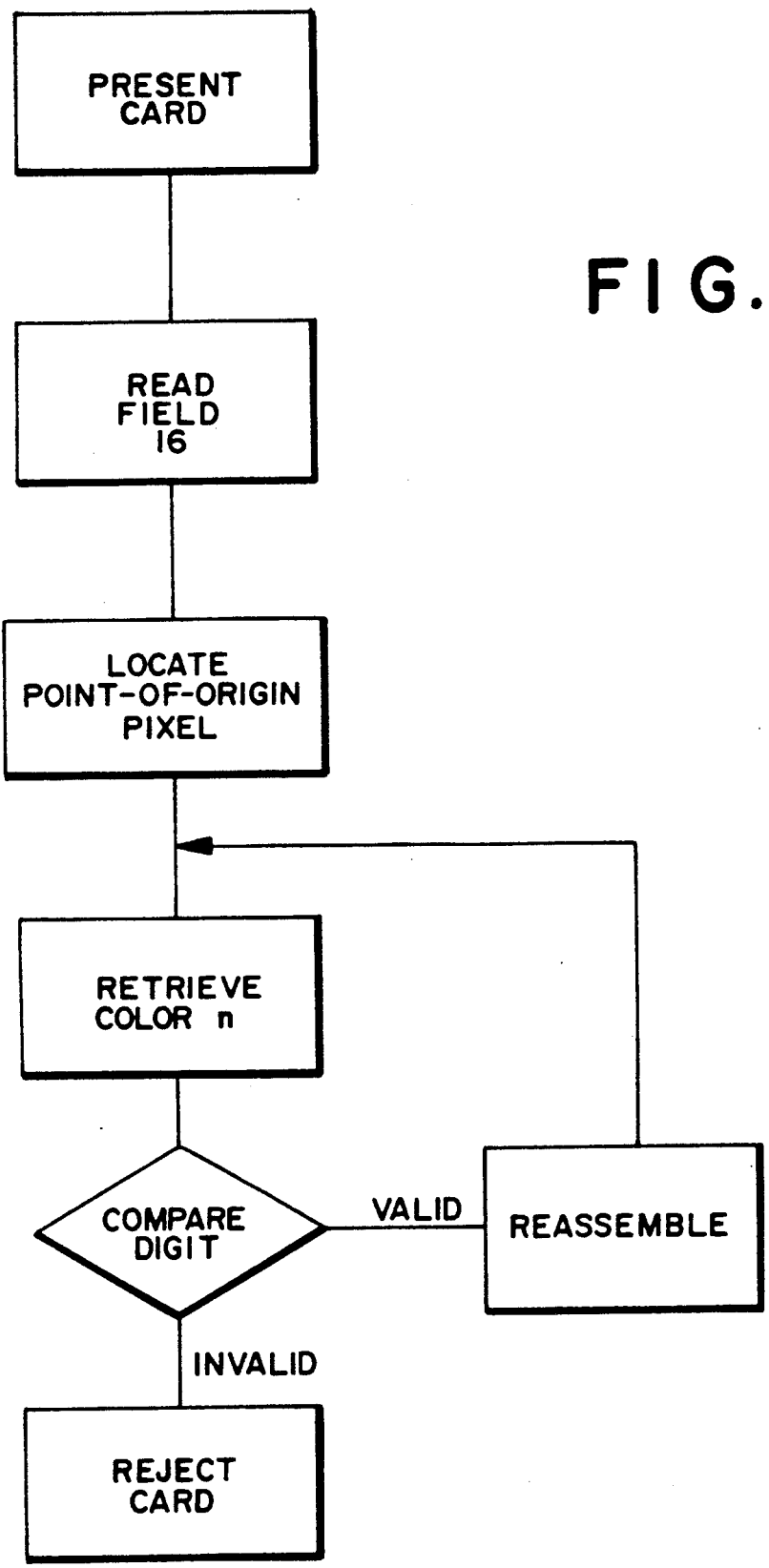
FIG. 6 illustrates in greater detail the decoding process of the invention.

FIG. 6 illustrates the decoding process of the invention in the data card environment. When a card holder in the current embodiment presents a card for payment at a retail store, for example, the sales clerk runs the card through decoder 20. Decoder 20 first reads field 16 (or field 18) for the initial PIN number or other key stored there. Pursuant to a prompt, then, the card holder enters the key for comparison by the decoder substantially as performed by, e.g., a conventional ATM. Of course, any key may be used, including a code word, digitized fingerprint, etc. Moreover, a plurality of keys may be stored, each key corresponding to a different type of data stored on the card. For example, a PIN number may be required to access banking information, the user's mother's maiden name for access to medical data stored on the card, and a key word stored for access to the user's facial image data. All data, of course, may be stored in one mass field or in separate fields using the encoding procedure described above.

Assuming that the user enters a valid key word and that the encoder verifies the validity, decoder 20 next seeks the point-of-origin pixel 26. Upon locating pixel 26, decoder 20 "reads" the information stored therein and begins scanning all data pertaining to the accessed information (here, the authorized user's face) for pixels of the first color. When all pixels of the first color have been retrieved, the first digit stored to correspond to the first color is retrieved as well. This digit is then compared to the first digit (e.g., the most significant digit) of the stored sequence. If the comparison is valid, the pixels of the first color are reassembled according to an algorithm that is constant to the system as a whole (i.e., all cards are scrambled and descrambled according to the same algorithm), according to an algorithm stored on the card by the encoder, or according to some other method that cannot be divined by an unauthorized user.

Once reassembling is complete, decoder 20 follows the instruction encoded in the last first-color pixel to jump to the next color and repeat the above procedure. All colors scrambled during the encoding process are similarly retrieved, descrambled (if necessary) and reassembled, and any pixels remaining are filled in as well, after decompression, if necessary. Of course, if the scrambled data are compressed during encoding, they will need to be decompressed prior to reassembly.

It is important to note that each place in the digit sequence must be verified before the next color is read. To further secure the data from unauthorized access, the digit sequence may be tied to the precise time at which encoding took place, carried out to as many digits as there are colors to be scrambled. For example, if encoding took place at precisely 13.0795743839 hours of the day (approximately 1:05 p.m.), a 12-digit number is provided that can be correlated digit-by-digit with 12 scrambled colors. The system thus requires a prospective hacker to potentially churn $10^{12}$ numbers before exhausting all possibilities simply to crack the order of scrambling. Another possibility is to devise an absolute standard of time so that, no matter what time of day encoding takes place, no two encodings could ever have the same digit sequence. This feature is especially important when the data is transferred over airwaves, where interception of a signal is trivial.

Additionally, the digit sequence may be established using a random or pseudorandom number generated by the encoder. The number could even be designed so that each digit is unique. This limits the number of pixel colors that can be encoded, however.

Returning to the current embodiment, the decoder system is then capable of displaying the image on display 24 for verification by the sales clerk. After authorization is approved or denied, a printout of the descrambled image is preferably made by printer 28 as described above. A separate recording of the transaction may also be desired, which recording may be of the descrambled image or the nature of the transaction and made to a central memory, for example.

As mentioned previously, the present invention has broad applications to the field of secure storage and transmission of data. The term *image*, where used above, should be understood as pertaining to the data stored on the card, whether they comprise a photographic image, an x-ray, or alphabetical or numerical data stored as an image. Therefore, the use of a card for storage of the secured facial image is pertinent to the specific embodiment described as well as to any embodiment in which data stored on a card is desired. A card, though, is merely one example of a storage medium in which the secured data may be held. In fact, the data represent, for example, a document transmitted by microwave, no card may be needed or desired. The receiver may simply be the input to the decoder 20 as outlined above.

Various modifications to the invention described above will become apparent to one of ordinary skill in the art. All such modifications that rely on the teachings through which the invention has advanced the state of the art are properly considered within the spirit and scope of the invention.

I claim:

1. A security system for discouraging unauthorized use of a data card, comprising:
    a data card including storage means for storing data in scrambled form;
    encoder means for encoding the storage means with personal identification data made up of individual data units, each unit having a specific value, said encoder means including means for reading a set of said units having a common value, rearranging said set of units having a common value according to a predetermined algorithm, reading a second set of units having a different common value, rearranging the second set of units, and repeating the process of reading and rearranging sets of data units until the personal identification data is substantially scrambled;
    decoder means for reading and unscrambling the scrambled personal identification data; and
    recorder means for recording the personal identification data to establish a record of the card user.

2. A security system for discouraging unauthorized use of a data card as claimed in claim 1, wherein the personal identification data comprise a digitized representation of a human face.

3. A security system for discouraging unauthorized use of a data card as claimed in claim 1, wherein the recorder means produces a recording comprising a printout of the personal identification data.

4. A system for providing the secure transmission of data, comprising:
    encoder means for image-wise encoding data in scrambled form, said encoder means comprising:
    data input means for image-wise receiving unscrambled data made up of individual data units, each unit having a specific value;
    scrambling means for scrambling said data according to a visual algorithm, said scrambling means including means for reading a set of said units having a common value, rearranging said set of units having a common value according to a predetermined algorithm, reading a second set of units having a different common value, rearranging the second set of units, and repeating the process of reading and rearranging sets of data units until said data is substantially scrambled; and
    transmitting means for transmitting the scrambled data and visual algorithm to a receiving means from which the data may be decoded; and
    decoder means for decoding the received scrambled data, said decoder means comprising:
    means for receiving and processing the scrambled data and visual algorithm;
    descrambling means for reading and descrambling the scrambled data according to the visual algorithm; and
    means for outputting the descrambled data.

5. A system for providing the secure transmission of data as claimed in claim 4, wherein the scrambled data are descrambled as they are received by the decoder receiving and processing means.

6. A system for providing the secure transmission of data as claimed in claim 4, further comprising scrambled data storage means for storing the scrambled data after the scrambled data have been received and processed, wherein the descrambling means reads the scrambled data from the storage means.

7. A method for encoding an image, comprising the steps of:
    scanning an image to produce a sequence of electrical image signals corresponding to the image, the electrical image signals defining individual pixels of the image;
    digitizing the electrical image signals; and
    encoding the digitized electrical image signals, said encoding step including the steps of:
    (a) selecting a point-of-origin pixel signal;
    (b) programming the point-of-origin pixel signal with a decoding instruction for subsequent reading by a decoder;

($c_1$) reading all pixel signals representing a first common color;
($d_1$) scrambling all pixel signals representing said first common color within the sequence of all pixel signals according to a first algorithm;
($e_1$) assigning a first character to the first common color;
($c_2$) reading all pixel signals representing a second common color;
($d_2$) scrambling all pixel signals representing said second common color within the sequence of all pixel signals according to a second algorithm;
($e_2$) assigning a second character to the second common color; and
(f) repeating steps ($c_n$)–($e_n$) for each nth color until all pixel signals representing a predetermined number of colors have been read, scrambled and assigned an nth character.

8. A method for encoding an image as claimed in claim 7, wherein at least the selection of said first common color comprises the decoding instruction programmed into the point-of-origin pixel signal.

9. A method for encoding an image as claimed in claim 7, wherein each character is different from each other character.

10. A method for encoding an image as claimed in claim 7, wherein each character is a numerical digit.

11. A method for encoding an image as claimed in claim 10, further comprising the step of recording a precise time of encoding, so that each numerical digit is one digit taken from the precise time, said precise time carried out to n digits.

12. A method for encoding an image formed by a plurality of individual image data units, comprising the steps of:
scanning an image to produce a sequence of electrical image signals corresponding to the image, the electrical image signals defining individual data units of the image;
digitizing the electrical image signals; and
encoding the digitized electrical image signals, said encoding step including the steps of:
(a) selecting a point-of-origin data unit signal;
(b) programming the point-of-origin data unit signal with a decoding instruction for subsequent reading by a decoder;
(c) reading all data unit signals representing a first common value;
(d) scrambling all data unit signals representing said first common value within the sequence of all data unit signals according to a first algorithm;
(e) assigning a first character to the first common value;
(f) reading all data unit signals representing a second common value;
(g) scrambling all data unit signals representing said second common value within the sequence of all data unit signals according to a second algorithm;
(h) assigning a second character to the second common value; and
(i) repeating steps ($c_n$)–($e_n$) for each nth value until all data unit signals representing a predetermined number of values have been read, scrambled and assigned an nth character.

* * * * *